(12) United States Patent
Johnson (10) Patent No.: US 7,556,068 B1
(45) Date of Patent: Jul. 7, 2009

(54) FLIP-OUT FUNCTION CONVERTER FOR TREE-MOUNTED FRAME APPARATUS USED IN ARBOR RIGGING PROCEDURES

(76) Inventor: Kent H. Johnson, 521 Hawthorne Ave., Los Altos, CA (US) 94024

( * ) Notice: Subject to any disclaimer, the term of this patent is extended or adjusted under 35 U.S.C. 154(b) by 623 days.

(21) Appl. No.: 11/270,854

(22) Filed: Nov. 8, 2005

Related U.S. Application Data (60) Provisional application No. 60/628,387, filed on Nov. 15, 2004.

(51) Int. Cl.
*A01G 23/08* (2006.01)
(52) U.S. Cl. ........................................ 144/4.1; 144/34.1
(58) Field of Classification Search .................. 144/4.1, 144/34.1; 254/199, 323, 266, 265; 414/787
See application file for complete search history.

(56) References Cited

U.S. PATENT DOCUMENTS

| | | | |
|---|---|---|---|
| 482,163 A * | 9/1892 | Cole | ........................... 104/115 |
| 4,239,188 A | 12/1980 | Hobbs | |
| 4,314,693 A | 2/1982 | Hobbs | |
| 5,484,253 A | 1/1996 | Johnson | |
| 5,971,363 A | 10/1999 | Good | |
| 6,439,595 B1 | 8/2002 | Cheng et al. | |
| 6,578,823 B1 * | 6/2003 | Johnson | ...................... 254/334 |
| 6,631,885 B2 * | 10/2003 | Halas | ......................... 254/225 |

\* cited by examiner

*Primary Examiner*—Shelley Self
(74) *Attorney, Agent, or Firm*—Thomas M. Freiburger (57) ABSTRACT

A flip-out function converter apparatus is attached to and functions in combination with a tree-mountable frame apparatus for use by arborists in handling loads in a wide variety of arbor rigging procedures. When positioned in its operational mode, the function converter apparatus enables additional functional rigging procedures to be performed which could not be effectively and efficiently performed with the original frame apparatus. When the function converter apparatus is positioned in its stowed mode in an unused recessed region of the frame apparatus, the frame apparatus can be used in its original application mode without interference from the function converter. In an embodiment of a frame apparatus with spikes, the function converter in its operational position enables the frame apparatus to be used in rigging procedures on live trees without the frame spikes producing damage to the bark and cambium layer of the live trees.

11 Claims, 10 Drawing Sheets

PRIOR ART

FLIP-OUT FUNCTION CONVERTER FOR TREE-MOUNTED FRAME APPARATUS USED IN ARBOR RIGGING PROCEDURES

BACKGROUND OF THE INVENTION

This application claims benefit of provisional application No. 60/628,387, filed Nov. 15, 2004.

The present invention relates to the general field of frame apparatus of the kind constructed to be mounted on the trunk of a tree for use by arborists for handling loads in arbor rigging procedures.

The present invention relates particularly to a flip-out function converter apparatus that is attachable to a tree-mountable frame apparatus such that it can be placed by a field operator in either a stowed positional mode or in an operational mode. In the stowed mode, the frame apparatus can function in its original design mode without interference from the converter apparatus. When the function converter is placed into a position for its operational mode, the frame apparatus is converted to a different functional and operational mode. In its operational mode, the function converter provides a suitable contact interface between the frame apparatus and a tree trunk and also provides appropriate structural elements to transfer high operational load forces from the frame apparatus to a tree trunk. Thus, the function converter is utilized to increase the number of optimal functions of a single frame apparatus and thereby to increase the applicability of the frame apparatus for a wider range of arbor rigging procedures with high effectiveness and with improved efficiency in the use of materials and operator labor.

Arborists frequently use a variety of frame apparatus attachable to the trunk of a tree for lifting, lowering, or constraining heavy loads in arbor rigging procedures. The two most common general functions of such devices are 1) to enable arborists to safely and efficiently trim, top and cable (i.e., maintain) live trees and 2) to safely and efficiently remove dead or live trees. The present invention will enable an arborist to perform both of these general rigging functions effectively and efficiently with a single frame apparatus and, thereby, reduce the overall operational costs of such arbor rigging procedures.

Existing tree-mountable frame apparatus are commonly found to have functionally unused recessed regions or cavities on the tree-facing side of the frame within the outer contours of tree-contact points of the frame apparatus. Although some of these regions are relatively small in volume, they provide the potential for the attachment and non-interference stowage of additional functional apparatus. Such recessed regions in frame apparatus are utilized in the applications of the present invention to extend the functional range of either a frame apparatus with spikes or a frame apparatus with pads.

For removal of either a live or dead tree, a frame apparatus with spikes (or pins) is commonly attached to the trunk of the tree for frame stability. In this use, any frame damage to the bark or cambium layer of the tree is not important. However, for the trimming, cabling and topping of live trees, damage to tree bark and cambium layer by spikes on a frame apparatus can result in stunted growth of the tree, in scaring of the tree bark, or, in severe cases, in killing the tree, particularly if it is a relatively small tree and doesn't receive adequate care after the damage. Damage to live trees from frame apparatus with spikes results not only from vertical load forces on a frame apparatus during rigging procedures but also from penetration of the bark and cambium in combination with the circumferential motion of the frame apparatus around a tree trunk produced by tightening of the mounting strap as the frame apparatus is mounted onto a tree trunk. Also, a frame apparatus is occasionally mounted on a nearby live tree as part of the arborist rigging procedure for removing a dead or live tree and sometimes for trimming, cabling or topping a nearby live tree. The shock loading of tree-mounted frame apparatus during arbor rigging procedures to remove tree limbs or stemwood commonly produce load forces on the frame apparatus that can exceed 2000 pounds.

U.S. Pat. No. 4,239,188 issued Dec. 16, 1980 to Hobbs and entitled "Tree Handling Device" and U.S. Pat. No. 5,484,253 issued Jan. 16, 1996 to Johnson and entitled "Conformed Frame Apparatus for Handling Loads Involved in Arbor Rigging Procedures" disclose frame apparatus which use spikes (pins) that are inserted into a tree trunk to improve stability of the frame during its use in arbor rigging procedures. U.S. Pat. No. 4,314,693 issued Feb. 9, 1982 to Hobbs and entitled "Device for Arborist Contractors" in reference to Hobbs' U.S. Pat. No. 4,239,188 states that: "Both forms of the invention described in the co-pending application damaged the tree to some extent either because a spike was driven into the tree or a notch was actually formed in the tree with a chain saw. These patents are incorporated by reference in this application.

Many arborists, who own or have access only to a frame apparatus with spikes for arbor rigging procedures on live trees, commonly use a separate elastomeric pad that is placed between the frame apparatus with spikes and a live tree on which it is being mounted to reduce spike damage to the tree bark and cambium. Each time the spiked frame apparatus is substantially repositioned on the tree, as commonly occurs during the rigging procedures, the pad must also be moved. This process increases the time (and thus the cost) required to complete the rigging procedures, as well as incurring costs for the elastomeric pads when they are damaged or lost. Such manually inserted pads, already cut to an appropriate size for use with a spiked frame apparatus, are now commercially available.

Attachment of an embodiment of the function converter apparatus of the present invention to a frame apparatus with spikes will convert the frame apparatus such that it can be used effectively and economically in arbor rigging procedures for trimming, cabling, and topping of live trees without producing spike damage to the tree bark and cambium. For this application the function converter apparatus in its operational mode not only shields the spikes from contact with tree bark and cambium, it also provides a suitable interface with the tree trunk and has the necessary structural elements to transfer the often high operational loads from the frame apparatus to the tree trunk. These operational features of the function converter distinguish this invention from a variety of flip-down devices that do not modify the operational and functional characteristics of the devices to which they are attached. See, for example, the U.S. Pat. No. 6,439,595 issued Aug. 27, 2002 to Cheng, et al.

To reduce frame damage to bark and cambium of a live tree, an embodiment of the frame apparatus disclosed in U.S. Pat. No. 5,484,253 includes elastomeric pads for contact points with the tree trunk. However, these pads are contained within rather complex, and thus relatively expensive, receptacles that are permanently attached to the frame apparatus. The pads cannot be removed when the frame apparatus is used in the removal of live or dead trees because the pad receptacles would be damaged during the rigging procedures. The pads also receive high stress and strain in the process of lowering heavy loads that are common during tree removal rigging processes. This process shortens the useful life of the pads and adds to the overall cost of using the padded frame apparatus. The load ratings for frames with pads are typically lower than similar frames with spikes.

U.S. Pat. No. 5,971,363 issued Oct. 26, 1999 to Good and entitled "Tree Winch Mounting System" also discloses the use of multiple compressible pads on the tree facing side of a tree winch mounting system to increase the resistance of the mounting system to vertical motion and to reduce damage to the tree trunk during rigging procedures. This patent is incorporated in this application by reference.

With only the pads of a frame apparatus interfacing with a tree trunk, particularly with heavy shock loads often present during tree removals, tree-mounted frame apparatus sometimes slides up the tree trunk when load forces are high. An example of a vertical displacement on prior art frame apparatus may be seen in Sherrill Inc., Arborist Supply Catalog, 2002, 11$^{th}$ Edition, page 22. The extent of vertical motion is highly dependent on load force, tree trunk shapes, tree bark structure and compressibility, and on frame apparatus mounting strap tension.

An embodiment of a frame apparatus shown in the aforementioned U.S. Pat. No. 5,484,253 of Johnson includes a hinged swing-out spike device to increase frame apparatus stability during loading. However, in this embodiment the spike assemblies are attached to and stowed on outer end portions of the frame structure, and this positional constraint limits the functional adaptability and suitability of the spikes. In this embodiment, the principal spikes for the penetration of a tree trunk during the mounting of the frame apparatus onto a tree trunk are attached to the outer end portion of the lower frame structure and are rotated outward beyond that outer end by the field operators. In this operational mode, the spikes are in an approximate vertical configuration, i.e., notched out of a metal flap that generally defines a vertical plane. Thus, they provide only a limited restraining area for resistance to high vertical forces, and cannot bite as effectively into the tree trunk as can generally horizontal spikes. In this embodiment, a flip-out spike attached to the outer top of the frame apparatus (and horizontal pivot axis) is commonly not effective in penetrating the tree trunk due, in part, to the circumferential motion of the frame during the process of mounting of the frame apparatus onto the tree trunk. Also, penetration of the tree trunk by this spike when the load beam of the frame apparatus is loaded is often not fully effective due to the irregular or sloping shape of the tree trunk or due to the thick and rough physical characteristics of some tree bark.

The present invention, in an embodiment utilizing a flip-out function converter apparatus with spikes, readily accommodates the use of operationally horizontal spikes with large horizontal interaction areas. These areas can be comparable to those commonly used on the patented frame apparatus with spikes discussed above and fully adequate to provide vertical frame stability for the high loads commonly encountered in tree-removal rigging procedures. For this embodiment of the flip-out function converter apparatus with spikes, it can be placed by the field operator in a non-interference positional mode within recesses in the tree-facing side of the frame apparatus whenever rigging procedures on live trees require the use of the rigidly fixed compressible pads on the frame apparatus.

The performance of a single rigging frame apparatus, that is presently available and constructed to be mounted on the trunk of a tree for use by arborists, is generally not optimal for both the removal of trees and for the maintenance of live trees. With integration of the present invention with such apparatus, the overall performance for both applications can be fully suitable with a single frame apparatus.

It is an object of the invention to enable a field operator easily and quickly to place a flip-out function converter apparatus into a stowed position in a recessed region on the tree-facing side of a frame apparatus with spikes so the converter apparatus does not interfere with the use of the spikes when the frame apparatus is used in rigging procedures to remove dead or live trees.

It is also an object of this invention to provide small but effective embodiments of function converters which may be stowed in small recessed regions on the tree-facing side of a tree-mountable frame apparatus with spikes such that they do not interfere with the original design function of the frame apparatus but also enables the frame apparatus to be effectively used on live trees when the function converter is placed in an operational mode to prevent spike damage to the tree bark and cambium. In this embodiment, a field operator can also quickly and easily select for the operational mode either an elastomeric material or a hard surface material as the interface surface for contact with a tree trunk.

Additionally, when the function converter is in its operational positions, it is an object of this invention to transfer, with appropriate converter structural elements, significant portions of the often high operational load forces on the frame apparatus through the function converter apparatus to the tree on which the frame apparatus is mounted.

It is a further object of this invention to enable an embodiment of the flip-out function converter apparatus which contains spikes to convert a tree-mountable frame apparatus whose tree interface contact points are elastomeric pads, into a device fully suitable for rigging procedures to remove dead or live trees. Thus, the invention encompasses a frame with fixed spikes selectively coverable or shieldable by a pad to protect the tree, or vice versa, a frame with fixed pads to protect the tree, selectively shieldable by a hinged flip device with one or more spikes, preferably horizontal-plane spikes.

It is a further object of the invention to enable a field operator easily and quickly to flip a hinged function converter apparatus with spikes into a stowed position on the frame apparatus with pads such that the converter apparatus does not interfere with the use of the frame apparatus with pads in rigging procedures for live trees.

Moreover, an object of the invention is to reduce the hazards to field operators when handling a frame apparatus with spikes, by keeping the function converter apparatus in an operational position which shields the spikes from inadvertent contact with the operator.

It is another object of this invention to protect frame spikes from bending or becoming dull from inadvertent contact with hard surfaces when being handled in the field, transported, or placed into storage.

Finally, another object is to remove the need for handling an unattached, large elastomeric pad for protecting a live tree from spike damage when a field operator uses a tree-mounted frame apparatus with spikes.

SUMMARY OF THE INVENTION

The present invention, a tree-mountable frame apparatus with a flip-out function converter apparatus, extends the functional range of the frame apparatus for use in arbor rigging procedures. Arborists working with trees have frequent need for tree-mountable frame apparatus to conduct efficient, effective, and safe arbor rigging procedures for two primary functions: (1) the removal of live or dead trees and (2) the maintenance of live trees by trimming, topping, or cabling them. Arborists commonly use a frame apparatus with tree-interface spikes in rigging procedures to remove trees and a different frame apparatus with tree-interface pads for live tree maintenance. Inclusion of the present invention in a recessed region of a frame apparatus will enable an arborist to perform both of the foregoing rigging functions effectively and efficiently with a single frame apparatus, and thereby, reduce the overall operational costs of such rigging procedures.

In one embodiment of this invention a function converter apparatus with an elastomeric pad is attached to a tree-mountable frame apparatus with spikes whose optimal function is for rigging use in the removal of live or dead trees since spike damage to the tree is not important. When the padded converter apparatus is placed in an operational mode adjacent to the spikes on the frame apparatus by the field operator, the frame apparatus is converted to a form fully suitable for use in rigging procedures on live trees. The padded function converter apparatus provides an appropriate interface surface to a live tree to limit damage to the bark and cambium of the tree, transfer load forces with appropriate structural elements from the frame apparatus to the tree, and prevents the spikes on the frame apparatus from contacting the bark or cambium of the tree.

In another embodiment of this invention, a flip-out function converter with integrated spikes is attached to a tree-mountable frame apparatus with elastomeric pads that are fully suitable for interfacing with live trees during arbor rigging procedures. However, such pads on prior art frame apparatus are found to provide only limited vertical stability to the frame apparatus when it is subjected to high vertical load forces such as those often encountered in rigging procedures for the removal of large trees. When the function converter apparatus with spikes is placed in an operational position by the field operator, the frame apparatus is converted to a form fully suitable for use in rigging procedures for the removal of live or dead trees. The spiked function converter in this form of the invention shields the frame pad from the tree.

Accordingly, the present invention provides more functional modes for a single tree-mountable frame apparatus and enables it to be used both for the removal of trees and for the maintenance of live trees. These extended function capabilities provided by a converter apparatus attached to a frame apparatus reduces the overall cost for arborist rigging procedures. In addition, the use of a function converter on a frame apparatus with spikes removes the need for the use of a separate manually-inserted elastomeric pad between a tree-mounted frame apparatus with spikes and the trunk of a live tree, prevents the dulling of spikes on a frame apparatus during the handling, transportation and storage of the frame apparatus, and improves the safety aspects for an operator when handling a frame apparatus with spikes.

DESCRIPTION OF PREFERRED EMBODIMENTS

Embodiments of this invention are compatible for use with a variety of tree-mounted frame apparatus used by arborists in tree removal and tree maintenance rigging procedures. Thus, some prior art frame apparatus is shown and discussed herein, along with descriptions of embodiments of this invention.

Figure 1:
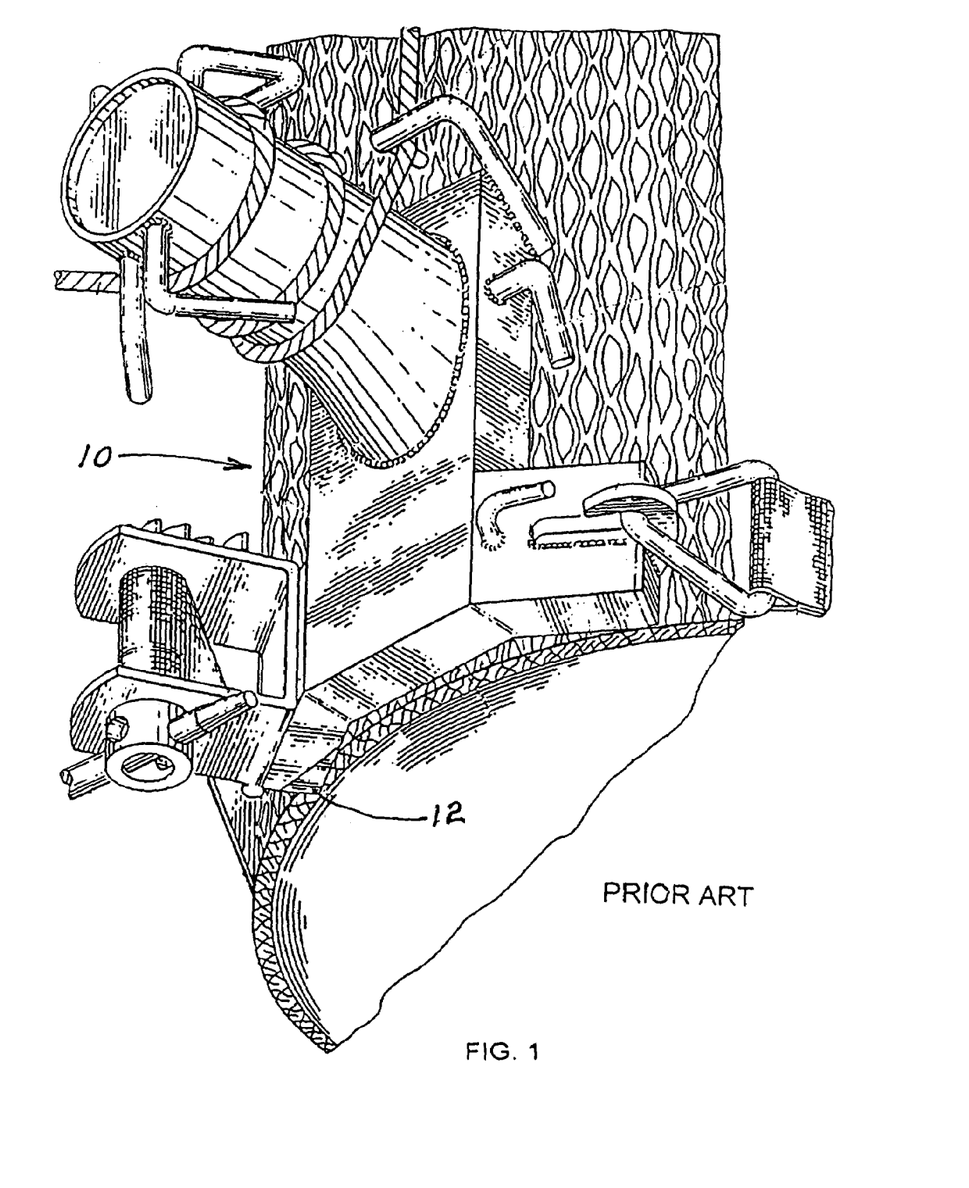
FIG. 1 is a perspective side view showing a prior art frame apparatus with spikes, mounted on the trunk of a tree. A spike is shown penetrating the bark of the tree, thereby increasing the frame stability when large vertical load forces are applied to the frame by vertical forces on the rope.

FIG. 1 is a perspective view showing a prior art tree-mounted frame apparatus 10 which is a type commonly used in the tree service industry and is described in U.S. Pat. No. 5,484,253, previously noted. This frame apparatus uses attached spikes to penetrate a tree trunk to provide frame stability under heavy loading. A spike 12 is shown penetrating the tree trunk.

Figure 2:
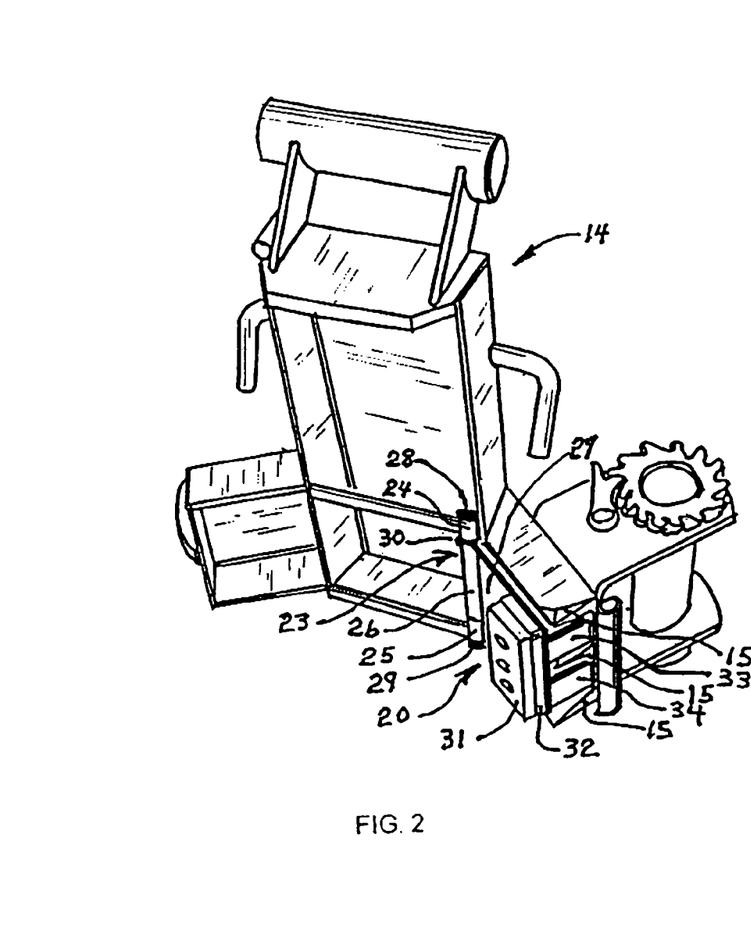
FIG. 2 is a perspective view showing the tree-facing side of a frame apparatus with spikes, similar to that of FIG. 1, that incorporates a flip-out function converter apparatus in accordance with one embodiment of the present invention. The function converter apparatus is shown in an operational position for interfacing an elastomeric pad with a tree trunk, for transferring load forces from the frame apparatus to the pad-tree interface position through the function converter structures, and for preventing the spikes on the frame apparatus from engaging the tree bark and cambium during arborist rigging procedures.

FIG. 2 shows in perspective the tree-facing side of a frame apparatus 14 of the type shown in FIG. 1 but with an attached embodiment of a flip-out function converter apparatus 20 of the present invention in an operational position to interface with a tree trunk. The converter apparatus 20 is attached to the frame apparatus 14 by a hinge assembly 23. The hinge assembly 23 consists of a top mounting tube 24 and a bottom mounting tube 25 welded to the frame apparatus structure, a hinge tube 26 welded to the hinge plate 27, a hinge axle bolt 28, and a locking nut 29. A wave spring washer 30 is inserted as a resilient spacer between the hinge plate tube 26 and the top attachment tube 24 to provide a frictional engagement force sufficient to overcome typical handling forces and gravity forces on the converter apparatus 20. The frictional forces produced by the wave spring washer 30 are to ensure that the converter apparatus 20 remains in the position that it is placed by a field operator during routine handling of the frame apparatus. An elastomeric pad 31 is shown in a pad holder 32 that is welded to the hinge plate 27. The pad 31 is attached to the hinge plate 27 by nuts and bolts not shown in this view, but are seen in a partially exploded view in FIG. 4. A top pillar or leg 33 and a bottom pillar or leg 34 are welded to the hinge plate 27 to transfer load forces produced on the frame apparatus to the interface of the pad 31 with a tree trunk when the frame apparatus is being used in arbor rigging procedures. The pillars 33 and 34 are essential force transfer components in effectively shielding spikes 15 from exposure to the tree. A simpler resilient pad could be attached to the hinge plate 27 instead of the more complex pad holder 32 and pad 31.

Figure 3:
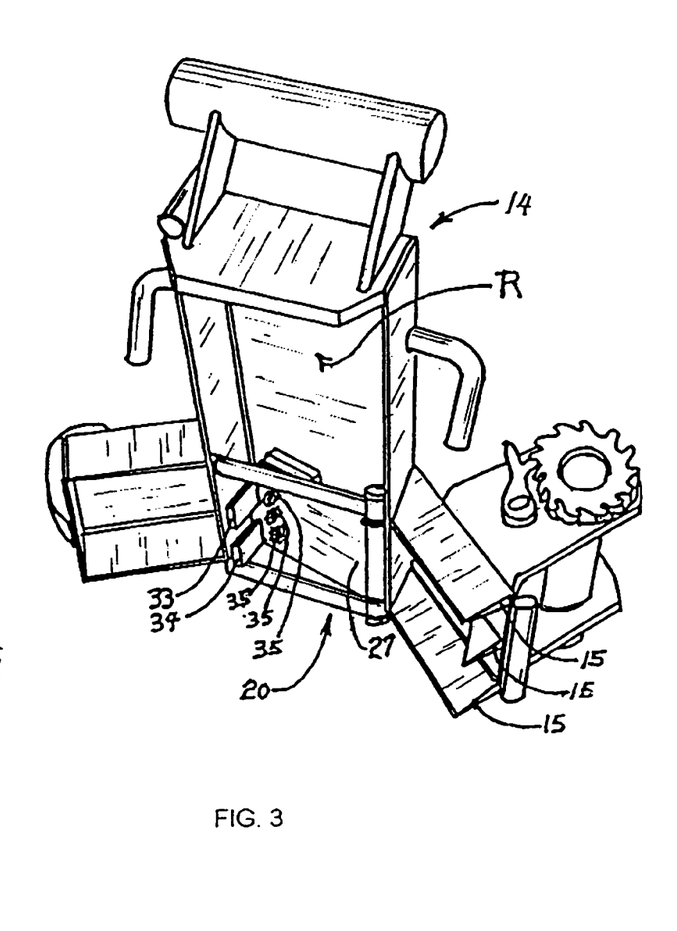
FIG. 3 is a perspective view of the frame apparatus with the function converter apparatus shown in FIG. 2, with the converter apparatus in a stowed positional mode within the central recessed portion of the frame apparatus so it does not interfere with engagement of the frame apparatus spikes with a tree trunk during an arborist rigging procedure.

The flip-out function converter apparatus 20, as described in FIG. 2, is shown in FIG. 3 in a stowed positional mode within a recessed region R of the frame apparatus such that the spikes of the frame apparatus can be used in rigging procedures by the field operator without interference from the converter apparatus 20. The back sides of the frame plate 27 and the support pillars 33 and 34 are seen in this perspective. The three nuts 35 are attached to the pad bolts which are not shown in this view but are shown in an exploded view in FIG. 4.

Figure 4:
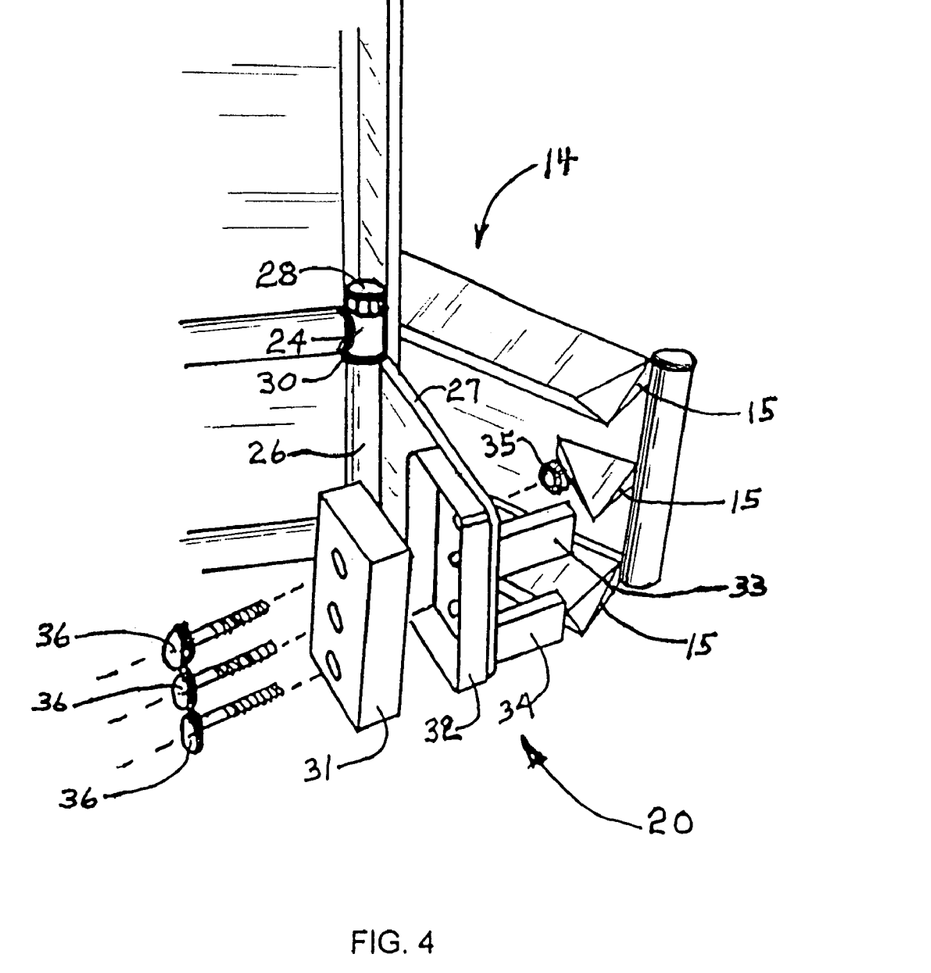
FIG. 4 is an isomeric, partially exploded view of the component parts of mounting and positioning structures of the embodiment of the invention shown in FIG. 2 and FIG. 3.

FIG. 4 shows a partially exploded view of the function converter apparatus 20 shown in FIG. 2 and FIG. 3. The pad 31 is attached to the hinge plate 27 and is held within the pad holder 32 by the three bolts 36 and locking nuts 35 (only one is seen in this exploded view). Other embodiments, utilizing different attachment modes for securing the elastomeric pads to the hinge plate 27, are also envisioned.

Figure 5:
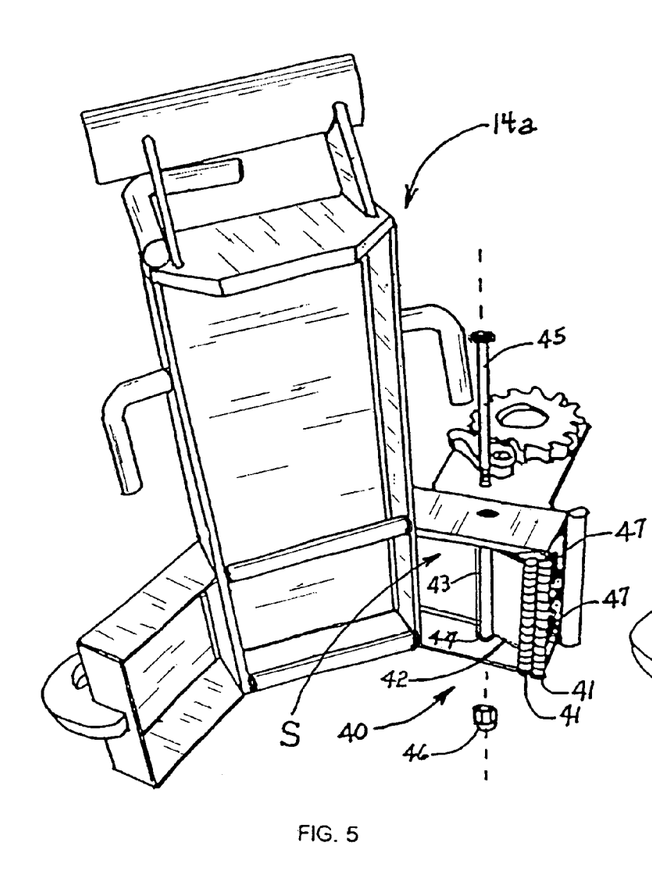
FIG. 5 is a perspective view showing another embodiment of a flip-out function converter apparatus integrated with a frame apparatus having spikes. This embodiment is generally smaller and less complex than the embodiment with a pad shown in FIG. 4. and thus it can be stowed in smaller volume when operational use of the spikes is required.

FIG. 5 illustrates, in a partially exploded view, an embodiment of a small flip-out function converter apparatus 40 that is suitable for utilizing a very small recessed region S of a frame apparatus. It is positioned to be attached by a hinge bolt 45 and a locking nut 46 to a prior art frame apparatus with spikes 14a. The converter apparatus 40, which is shown in an operational position, includes one or two (as shown) metallic rods 41 having rough surfaces that are appropriate to serve as hard interface surfaces with a tree trunk for many arbor rigging procedures on a live tree without producing significant damage to the tree bark or cambium. The rods 41 are welded to the attachment plate 42 which is welded to the hinge tube 43. A wave spring washer 44 is inserted between the frame apparatus and the hinge tube 43 to provide a suitable frictional force for positioning the components attached to the hinge plate 42. The hinge bolt 45 is inserted through the frame apparatus, the hinge tube 43, and the wave spring washer 44 before being fully attached to the frame apparatus by the lock nut 46. Support pillars or legs 47 (seen more clearly in FIG. 6) are welded to the support plate 42 and transfer a portion of the load forces from the frame apparatus to the tree interface through the rods 41. A portion of the load forces on the interface rods 41 is also transferred from the frame apparatus through the hinge bolt 45. Other interface materials, such as an elastomeric pad, could also be attached to the hinge plate 42 instead of the rods 41.

Figure 6:
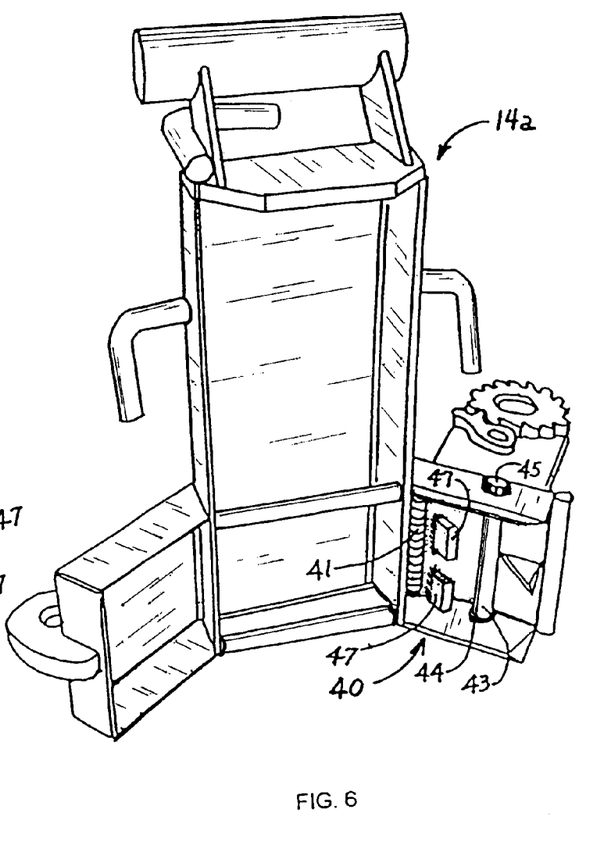
FIG. 6 is a perspective view of the embodiment of the function converter apparatus shown in FIG. 5, shown in a stowed position within a recessed region of an end portion of the lower frame apparatus structure.

FIG. 6 illustrates the embodiment of the flip-out function converter apparatus 40 as shown in FIG. 5, in a stowed position in the relatively small recessed regions S of the lower end portion or wing section of the prior art frame apparatus, 14a.

Figure 7:
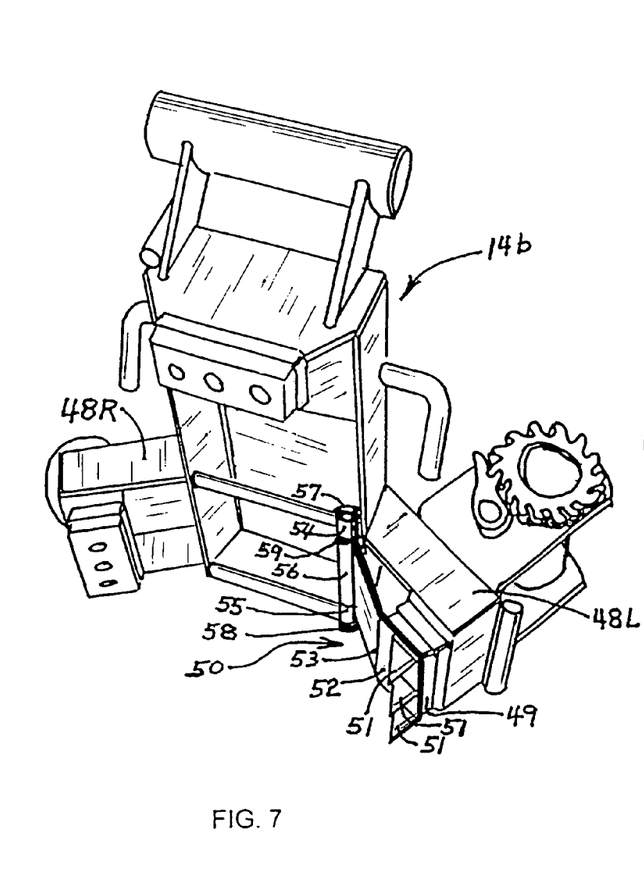
FIG. 7 is a perspective view of a prior art frame apparatus with pads in which the lower ends are fixed and of an embodiment of the present invention in which a flip-out converter apparatus with spikes is pivotally attached to the frame apparatus and is shown in an operational position.

FIG. 7 is a perspective view of an embodiment of this invention which shows a flip-out converter apparatus 50 with spikes attached to a padded frame apparatus 14b with fixed lower-end frame sections 48L and 48R. In this configuration, the converter apparatus 50 converts a prior art padded frame apparatus (elastomeric pad 49) into a fully adequate system for use by arborists in tree removal rigging procedures involving high vertical loads. In a sense this is the converse of the embodiments shown in FIGS. 2-6. Spikes 51 are welded to a spike attachment plate 52 which is welded to the hinge plate 53. The upper attachment tube 54 and the lower attachment tube 55 are welded to the frame apparatus 14b. The hinge tube 56 is welded to the hinge plate 53 and held in position by the hinge axle bolt 57. In the hinge assembly process, a wave spring washer 59 is inserted between the upper attachment tube 54 and the hinge tube 56 for the friction purposes discussed in reference to FIG. 2. The lock nut 58 secures the axle bolt to the frame apparatus. When the spikes 51 are swung to the FIG. 7 position and engaged with a tree trunk during an arborist rigging procedure, load forces on the frame apparatus 14b are transferred to the spikes, and thus to the tree, through the upper and lower attachment tubes 54 and 55 and the back of the spike attachment plate 52, which bears against the fixed elastomeric pad 49.

Figure 8:
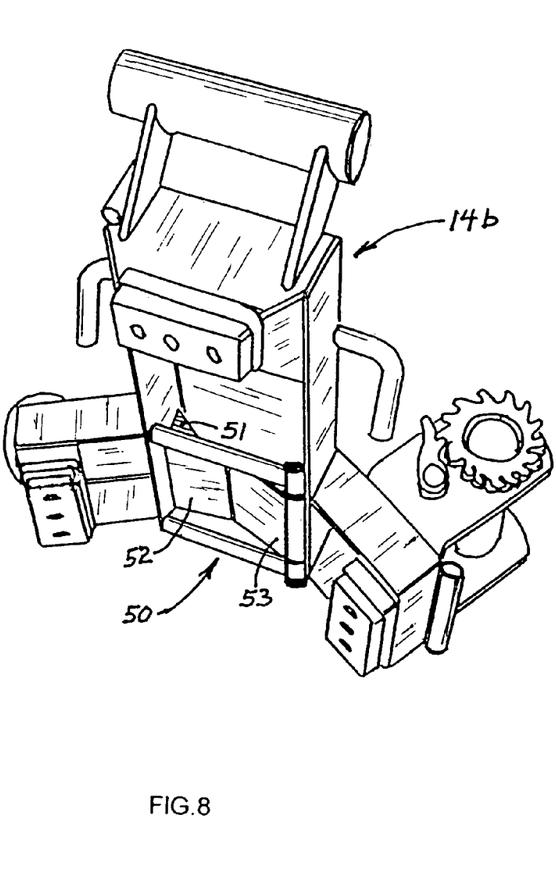
FIG. 8 is a perspective view of the frame apparatus with the function converter apparatus shown in FIG. 7, but with the converter apparatus with spikes in a stowed positional mode so as not to interfere with engagement of the frame apparatus pads during an arborist rigging procedure in the maintenance of a live tree.

FIG. 8 illustrates the flip-out function converter apparatus 50, previously shown in FIG. 7, in a stowed position in a recessed region of the prior art frame apparatus 14b. The back sides of the spike attachment plate 52 and the hinge attachment plate 53 (which act as a single plate) are evident.

Figure 9:
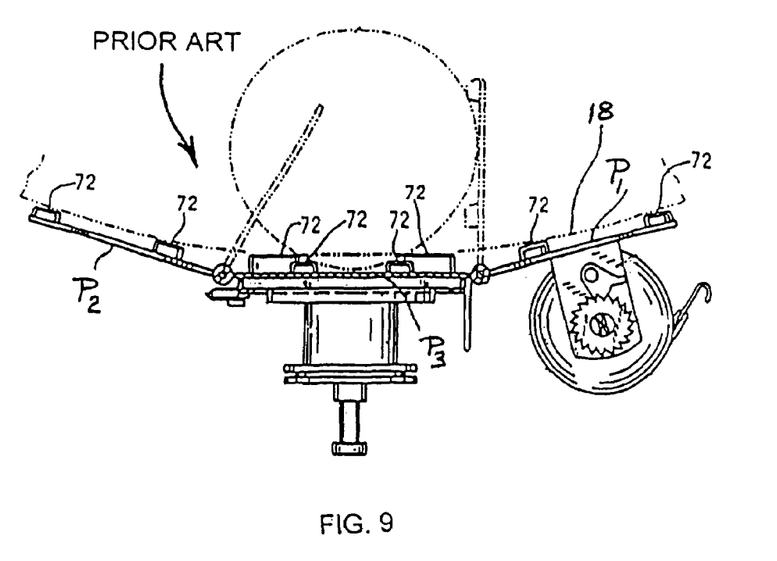
FIG. 9 is a top view of a prior art tree winch mounting system with a frame apparatus containing multiple pads for interface contacts with a tree trunk.

FIG. 9 is a prior art drawing from U.S. Pat. No. 5,971,363, previously discussed, showing a top view of a tree winch mounting system with a frame apparatus of another type, containing multiple pads for interface contacts with a tree trunk. Recessed regions between the point-to-point contours of the contact surfaces of the pads 72 and frame plates $P_1$, $P_2$ and $P_3$ are suitable recessed regions for inclusion of embodiments of the flip-out function converter apparatus of the present invention. In this drawing the trunk profile of a segment of a large tree 18 is indicated by a dashed and dotted line.

The plates $P_1$ and $P_2$ can be called wing sections and the plate $P_3$ can be called a central frame section.

Figure 10:
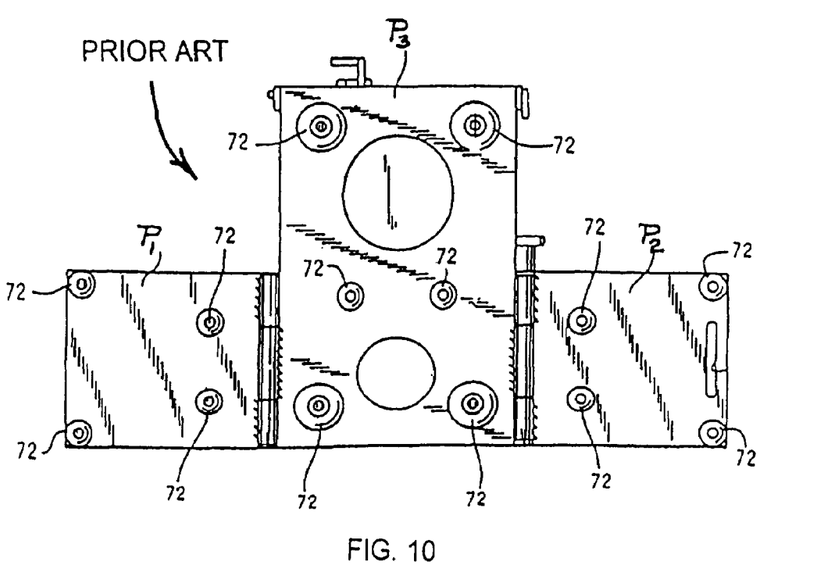
FIG. 10 shows the tree-facing side of the prior art mounting system of FIG. 9, detailing the location of multiple pads.

FIG. 10 shows the tree-facing side of the prior art drawing of FIG. 9 and details the location of the multiple elastomeric pads 72. It is evident from the relatively large areas of the recessed regions that more than one unit of an embodiment of the present invention could be attached if required for increased frame stability or adaptability to different size trees.

Figure 11:
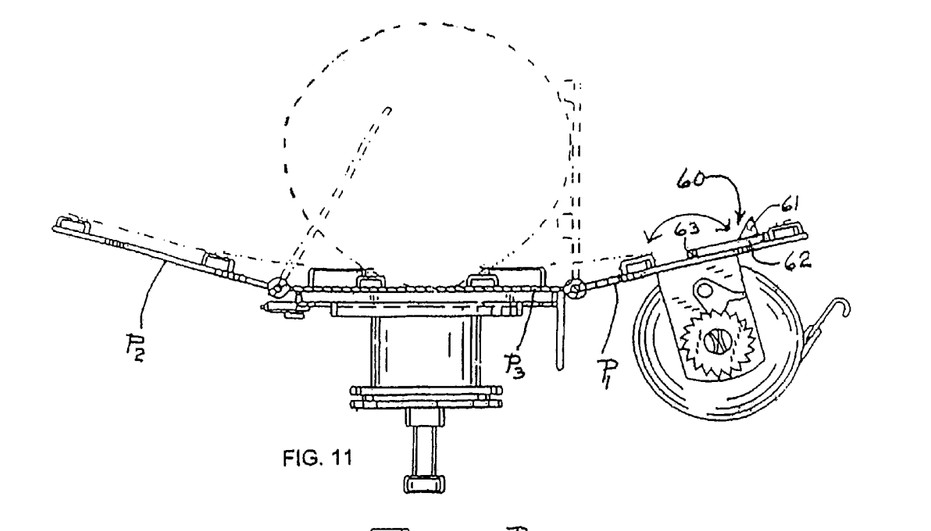
FIG. 11 shows a top view of an embodiment of a spiked flip-out function converter of this invention in an operational position attached to a frame apparatus such as shown in FIG. 9.

FIG. 11 shows the same view of the frame apparatus shown in FIG. 9 and shows, in an operational position, an embodiment of a flip-out function converter apparatus 60 with a single spike 61. The spike 61 is welded to the hinge attachment plate 62. The head of the axle bolt 63 is shown in its attached position.

Figure 12:
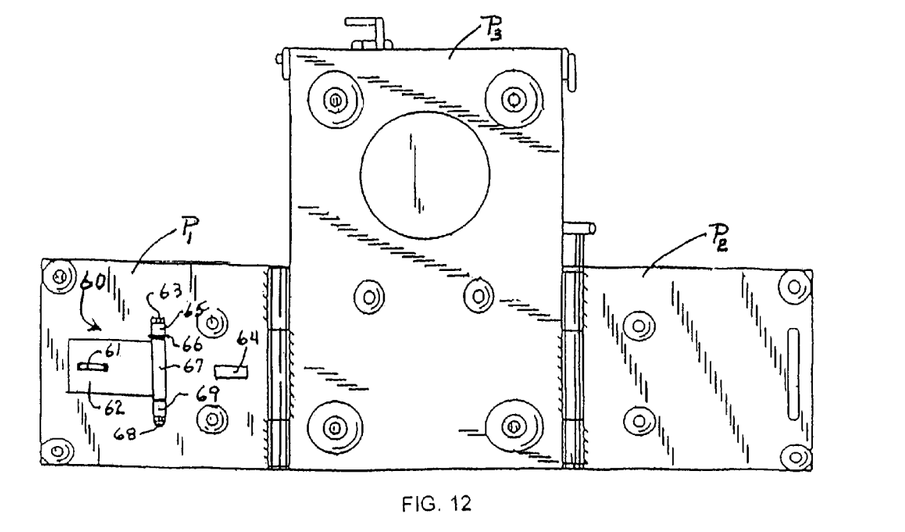
FIG. 12 shows the embodiment of FIG. 11, again in the spike-active position, and showing the tree-facing side of the apparatus.

FIG. 12 illustrates, in the same tree-facing view shown in FIG. 10, the converter apparatus 60 in its operational position as discussed relative to FIG. 11. The hinge attachment plate 62 is welded to the hinge tube 67. The upper attachment tube 65 and the lower attachment tube 69 are welded to one of the wing sections or side frame plates $P_1$ and $P_2$ shown on the section $P_1$ in FIG. 12. A wave spring washer 66 is inserted between the hinge tube 67 and the upper attachment tube 65 to provide a frictional force to keep the frame attachment 62 positioned as discussed earlier for a similar component in FIG. 2. The axle bolt 63 is secured by the axle locking nut 68. The slotted hole 64 is added to the prior art frame to accommodate the spike 61 when the converter apparatus 60 is placed in the stowed position as shown in FIG. 13.

Figure 13:
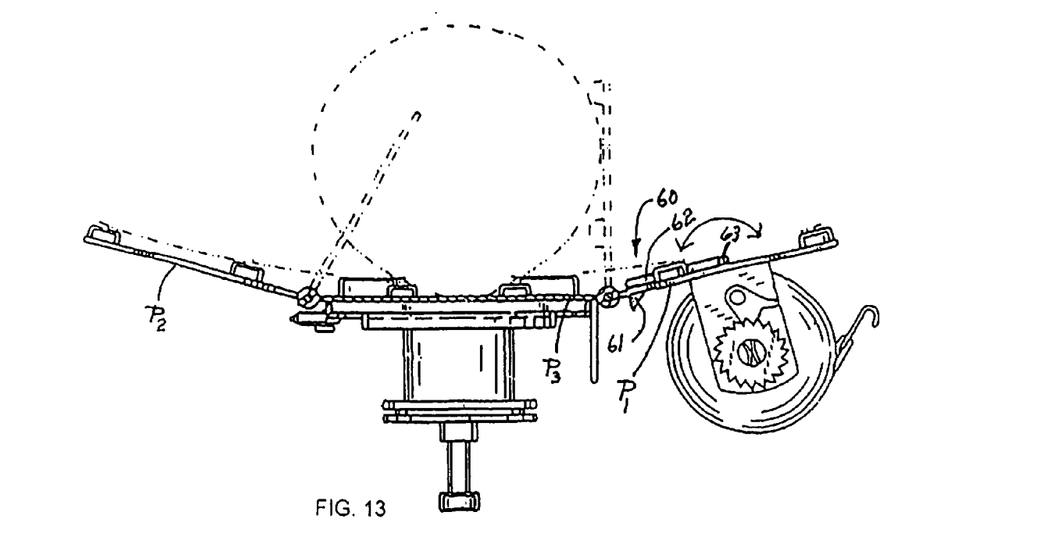
FIG. 13 is a view similar to FIG. 11 but showing the stowed position of the spiked function converter.

FIG. 13 shows the frame apparatus as seen in FIG. 11 and shows the function converter apparatus 60 in a stowed position such that it does not interfere with the intended design function of the spikeless frame apparatus as in the prior art. The spike 61 is seen to protrude through a hole 64 (shown as slotted, see FIGS. 12 and 14) in the wing section or plate $P_1$, and a cover for the protruding spike 61 could be added if required for safety reasons.

Figure 14:
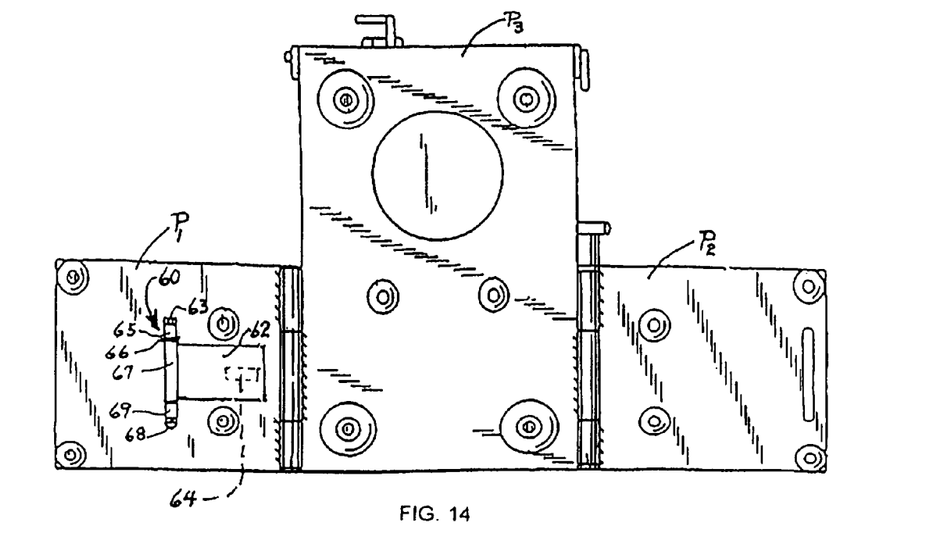
FIG. 14, from the same view as FIG. 12, shows the spiked function converter in a stowed position on the frame apparatus.

FIG. 14 is the tree-facing view seen in FIG. 12 and shows the converter apparatus 60 in the stowed position shown in FIG. 13. The dotted lines shown on the back of the attachment plate 62 indicate the slotted hole 64 shown clearly in FIG. 12.

It should be understood that, although not shown in the drawings, the function converter apparatus can also (or alternatively) be included in the other wing section $P_2$ or in the central frame section $P_3$. Note also that the central frame section and wing sections $P_1$, $P_2$ and $P_3$ can also be in different configurations, not necessarily planar as shown. In addition, note that particularly for the frame apparatus shown in FIGS. 11-14, the function converter or converters, could be modified in another way. The function converter 60 could be mounted on the outside of the plate or wing section $P_1$ or $P_2$ (or central section $P_3$), to swing to an operable position in which the spike 61 extends through a plate hole inwardly. An appropriate form of latch can be included to hold the spike in position to allow it to penetrate into the tree. A similar function converter could also be hinged at an outer edge of a wing section or plate such as $P_1$ or $P_2$, to be swung around from an outer stowed position to an inner operable position against the inside of the plate.

Figure 15:
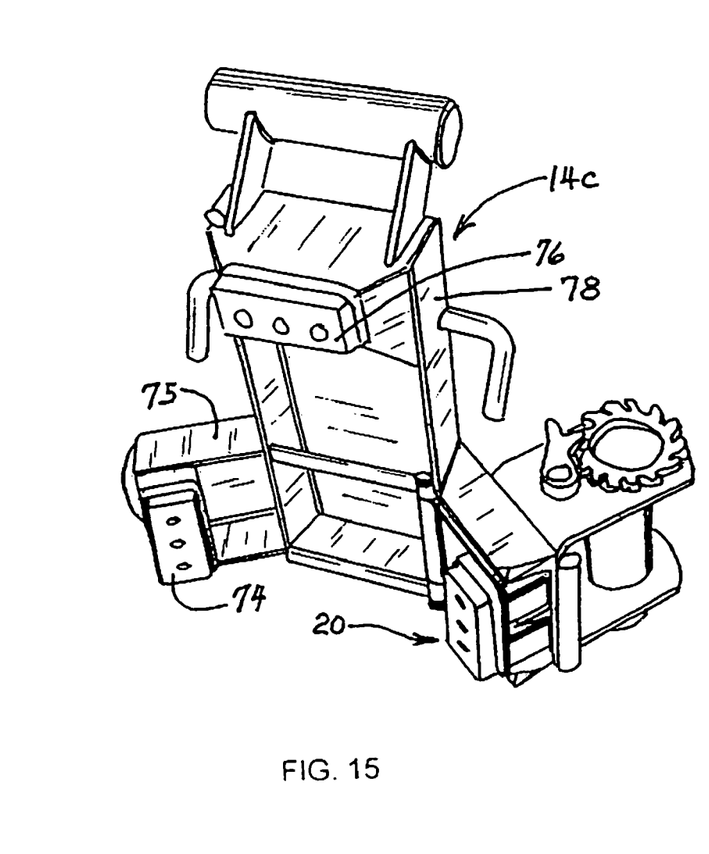
FIG. 15 is a perspective view of an embodiment of a tree-mountable frame apparatus with spikes that has fixed elastomeric pads at two positions for contact with a tree trunk. Also shown attached to the frame apparatus is the function converter of the invention shown in FIG. 2, in the operational position.

FIG. 15 is a perspective view of a spiked frame apparatus 14c, basically similar to Johnson U.S. Pat. No. 5,484,253, that has pads at two frame positions, one pad 74 on a fixed side wing structure 75 and another pad 76 at an upper location on a center component of the main frame structure 78, and also shows the inclusion of the embodiment of the flip-out function converter apparatus 20 described earlier with reference to FIG. 2. This configuration with the pads at locations shown provides added protection for the bark and cambium of live trees compared to the configuration shown and discussed for FIG. 2, and may be preferred particularly by arborists whose activities include a high percentage of their rigging efforts on live trees.

Figure 16:
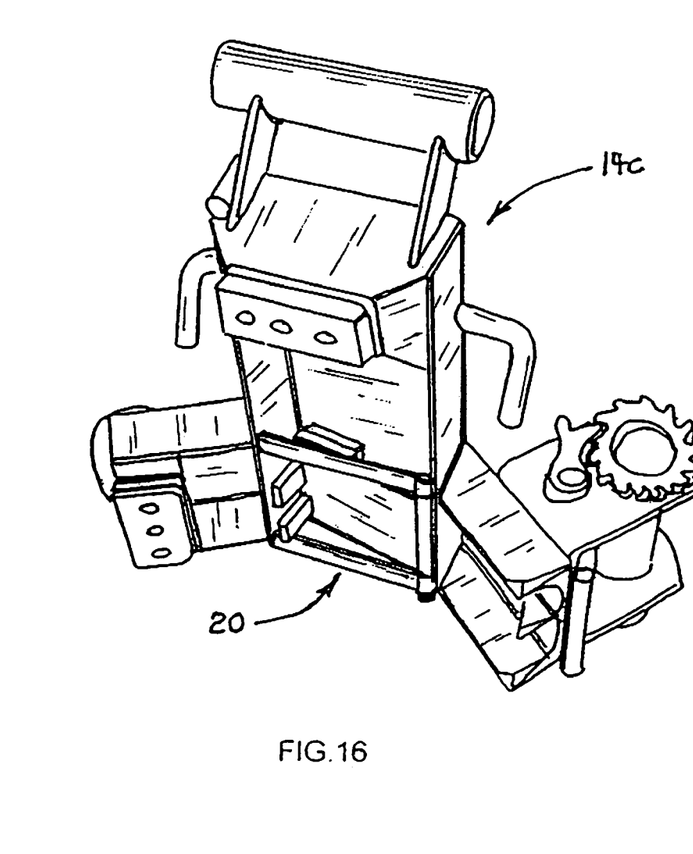
FIG. 16 shows the apparatus of FIG. 15 but with the padded function converter in stowed position.

FIG. 16 illustrates the converter apparatus 20, as shown in FIG. 15, in a stowed position in a recessed region of the frame apparatus 14c.

Figure 17:
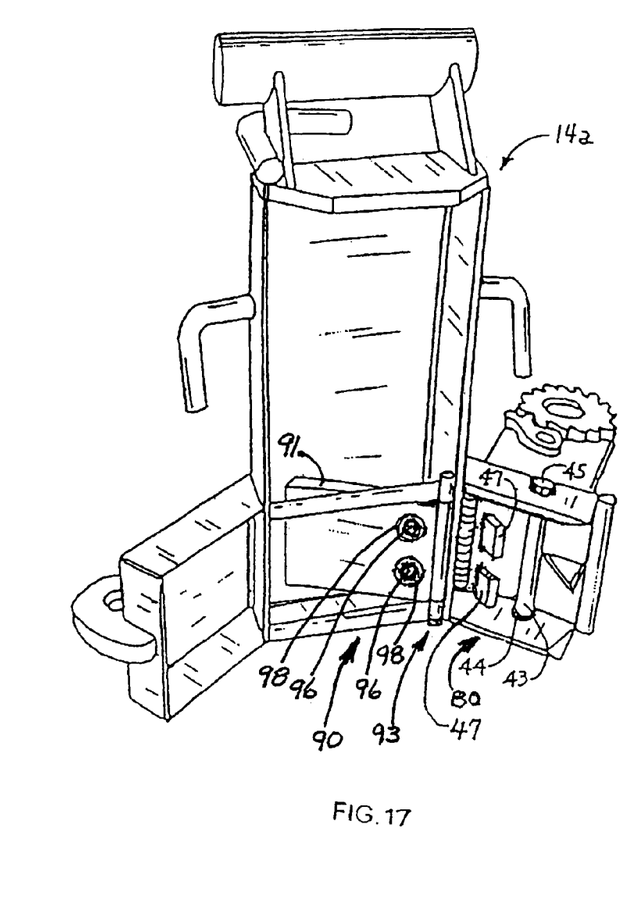
FIG. 17 illustrates a combination of the types of function converter embodiments shown in FIG. 2 and FIG. 5. The three function converter units are shown in stowed positions.

In a combined embodiment shown in FIG. 17, two flip-out function converter units 80 and 90 are shown in their stowed positions within recessed regions of a frame apparatus 14d. In these stowed positions, the frame apparatus 14d with spikes can be used in its original design mode for rigging functions employed in the removal of trees or other high frame loading operations without interference from the stowed function converter units.

Figure 18:
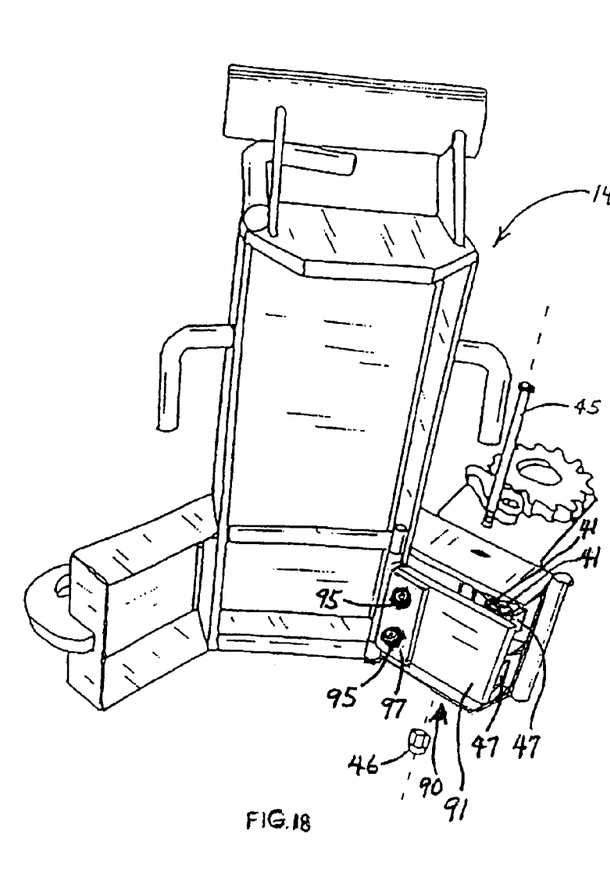
FIG. 18 shows the three function converter units seen in FIG. 17 positioned in an operational mode.

For many rigging operations (e.g., trees with thick bark), the flip-out unit 80 (which can be the same as or similar to the unit 40 in FIGS. 5 and 6) can be placed in the operational mode and used with the frame apparatus as discussed in relation to FIG. 5. For a tree with thin and delicate bark, the flip-out unit 90 with its elastomeric pad 91 can be placed by a field operator in an operational mode as illustrated in FIG. 18 to serve as a pliable interface between the flip-out unit 80 and the trunk of a tree. The hinge assembly 93 illustrated in FIG. 17 and FIG. 18 is shown with the same construction as the hinge assembly 23 illustrated and discussed for FIG. 2. However, in this embodiment, the hinge plate 97 does not extend in the operational mode to the position of the rods 41. Thus, as seen in FIG. 18, the elastomeric pad 91 contacts the rods 41 and during arborist rigging procedures transfers frame load forces to the trunk of a tree. The pad 91 is attached to the hinge plate 97 with two bolts 96, washers 98, and nuts 95. The two flip-out units 80 and 90 give the operator choices as to the interface with the tree at that side wing or section of the apparatus, when spike engagement is to be avoided. It is envisioned that a converter unit similar to the flip-out unit 90 could also be used to provide an elastomeric pad as an interface between the hard edges of the frame apparatus 14d and the thin bark of a young tree.

Although not specifically illustrated, the invention is also applicable to a frame apparatus having left and right wings or frame extensions connected by pivot connections to a main (central) frame section, such as one embodiment of a frame structure shown and described in U.S. Pat. No. 5,484,253, as opposed to the fixed (welded) wing structures of the embodiments described above. FIGS. 11-14 illustrate one embodiment of the invention or one particular type of pivoted-wing frame apparatus, but wing structures similar to FIGS. 17 and 18, for example, could also be pivoted.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. In a tree-mountable frame apparatus optimized for tree removal in arborist rigging procedures and having a tree-facing side configured for contact with a tree trunk at three contact positions, the frame apparatus having a central frame section and a pair of wing sections extending laterally from opposed sides of the central frame section, a means of improved engagement with a live tree while retaining the full capability for tree removals, comprising:

the tree-mountable frame apparatus including a plurality of spikes comprising generally horizontally-oriented blades at least at one of the contact positions, and the frame apparatus having a recessed region on the tree-facing side, and a function converter device for selectively protecting a tree trunk against penetration by the spikes, comprising a hinged flip-out bracket having on one side a non-spiked tree engagement surface, said flip-out hinged bracket being mounted on the frame apparatus for pivotal swinging movement on a generally vertical hinge axis which is spaced away from the spikes, and which is spaced inwardly from outer lateral ends of the frame apparatus, such that said flip-out bracket has a stowed position in the recessed region of the frame apparatus, essentially out of contact with a tree trunk when the frame apparatus is in use engaging the spikes with a tree, and a rotated, operational position with said bracket adjacent to sharp ends of the spikes in a position to shield the spikes and prevent any substantial penetration of the spikes into the tree trunk.

2. The apparatus of claim 1, one of the wing sections comprising at least two generally horizontal and parallel flanges extending laterally from the central frame section, the flanges being spaced apart and having ends sharpened to form said generally horizontally-oriented blades and said spikes, and wherein said flip-out bracket member is pivotally connected on said generally vertical hinge axis to said two spaced apart flanges.

3. The apparatus of claim 1, wherein the frame apparatus includes a central frame section and a pair of wings extending from opposed sides of the central frame section, and wherein said flip-out bracket member is pivotally connected on a generally vertical axis to the central frame section.

4. The apparatus of claim 3, wherein the central frame section includes a pair of generally vertical, parallel and spaced apart flanges forming a space in the central frame section open on the side to be directed toward a tree trunk, and where said flip-out bracket member has a stowed position swung into the space.

5. The apparatus of claim 1, wherein the non-spiked tree engagement surface comprises an elastomeric pad on said flip-out bracket.

6. The apparatus of claim 5, wherein the elastomeric pad is connected by fasteners extending through the pad and connected to a metal portion of the flip-out bracket.

7. The apparatus of claim 2, wherein the two wings are constructed similarly, each with said two generally horizontal and parallel flanges extended laterally from the central frame section, and including a said flip-out bracket member connected to each wing.

8. The apparatus of claim 2, wherein said flip-out bracket member comprises a first flip-out member, and further including a second, overriding flip-out bracket member pivotally attached to the frame apparatus and being connected on a generally vertical axis to the central frame section, the second, overriding flip-out bracket member having a stowed position essentially within the central frame section and having an operational side with an elastomeric pad, the second, overriding flip-out bracket member being positioned to ride over the operational position of the first flip-out bracket member which shields the spikes, whereby padded tree engagement surface is provided when desired.

9. The apparatus of claim 1, wherein the hinged flip-out bracket comprises a swingable plate attached on said generally vertical hinge axis to the frame apparatus, the plate lying in a generally vertical plane, and at least one support pillar on the plate, generally perpendicular to the plane of the plate, the pillar being positioned to engage the frame between spikes when the flip-out bracket is in the operational position, and thereby to transfer load forces from the frame apparatus to said plate and to prevent said plate from engaging the spikes.

10. The apparatus of claim 1, wherein the non-spiked tree engagement surface on the flip-out bracket of the function convertor includes a rough surface positioned to engage against a tree.

11. The apparatus of claim 1, wherein the hinged flip-out bracket includes, on a side opposite said one side, load-supporting pillars or legs affixed to the flip-out bracket in position to transfer load forces from the frame apparatus to the tree engagement surface and to a tree when the hinged flip-out bracket is in the rotated, operational position with the bracket adjacent to sharp ends of the spikes.

\* \* \* \* \*